United States Patent Office 3,417,039
Patented Dec. 17, 1968

3,417,039
CHLORINE CONTAINING RESINS STABILIZED WITH MIXTURES COMPRISING NOT MORE THAN TWO METAL SALTS, A POLYOL AND A SULFUR CONTAINING COMPOUND
Richard J. Penneck, Colchester, England, assignor to Bakelite Xylonite Limited, a British corporation
No Drawing. Filed Apr. 23, 1965, Ser. No. 450,527
Claims priority, application Great Britain, Apr. 25, 1964, 17,263/64
17 Claims. (Cl. 260—23)

ABSTRACT OF THE DISCLOSURE

Stabilizing compositions that contain not more than two metal salts of organic acids, a polyhydric alcohol, an organic sulfur containing compound and optionally in addition an epoxy compound are disclosed. These compositions are useful as stabilizers for chlorine containing polymers.

---

This invention relates to stabilizing compositions and polymer compositions thereof and more particularly to color stabilizing compositions for chlorine containing polymers and compositions thereof.

By the term "chlorine containing polymer" is meant throughout this specification any polymer in which at least 50 percent by number of polymerized units are formed from chlorine containing unsaturated olefinic monomers. Examples of these monomers are vinyl chloride, vinylidene chloride and cis or trans dichloroethylene. They can be polymerized to form copolymers with monomers such as vinyl acetate, vinyl propionate, vinyl alkyl ethers and methacrylic, fumaric and maleic esters.

Typical chlorine containing polymers are polyvinyl chloride, post chlorinated polyvinylchloride, graft or block copolymers in which polyvinyl chloride is the main constituent, copolymers formed from vinyl chloride containing about 4 percent by weight vinylidene chloride, or vinyl chloride containing about 10 percent by weight of vinyl acetate, or vinyl chloride containing about 15 percent by weight of dioctyl fumarate or vinyl chloride containing approximately 4 percent by weight of the vinyl alkyl ether such as vinyl cetyl ether.

The polymers can be prepared by any appropriate method e.g. a vinyl chloride homopolymer can be prepared by emulsion, suspension or bulk polymerization techniques and copolymers of vinyl chloride and vinyl acetate can be prepared by emulsion suspension or solution techniques.

Chlorine containing polymers tend to undergo undesirable changes particularly with regard to color formation when fabricated at elevated temperatures and stabilizers have been incorporated in the polymer in attempts to prevent or reduce these changes. One class of stabilizers are the organic salts of certain metals.

Examples of the metals from which these salts are formed are lithium, sodium, potassium, magnesium, calcium, zinc, strontium, barium, cadmium aluminum, tin, antimony and lead. Typical stabilizer metal salts can be prepared from organic acids having 4 to 18 carbon atoms. Such acids can be saturated or unsaturated aromatic, aliphatic, or alicyclic acids which can be substituted by hydroxyl groups, halogens, sulfur or oxygen. Some examples of these acids are maleic acid and acid esters, fumaric acid and acid esters, itaconic acid and acid esters, benzoic acid, capric acid, 2-ethyl hexoic acid, p-tertiary butyl benzoic acid, salicyclic acid, acetyl salicylic acid, p-chlorobenzoic acid, 2,4-dichlorobenzoic acid, phthalic acid and acid esters, 3,6-endomethylene 1,2,3,6-tetrahydrophthalic acid and acid esters, chlorendic acid and acid esters, Versatic 911, a registered trademark covering a mixture of acids consisting mainly of fully saturated highly branched tertiary aliphatic and alicyclic mono-carboxylic acids which contain 9, 10 and 11 carbon atoms, lauric acid, stearic acid, 12-hydroxy stearic acid and epoxy stearic acid. The salts can also be formed from a phenol or substituted phenol, e.g. phenol, p-chloro phenol and p-octyl phenol. These metal salts can be used either singly or mixed with other compounds, such as polyhydric alcohols and organic sulfur bearing compounds.

Accordingly, it is an object of the present invention to provide novel color stabilizing compositions for chlorine containing polymers in which a metal salt or salts, a polyhydric alcohol, and an organic sulfur bearing compound comprise the novel stabilizing composition.

As a further object, the present invention provides a composition consisting of a chlorine containing polymer and a stabilizing amount of the aforesaid novel stabilizing composition.

The present invention provides a stabilizing composition for chlorine containing polymers comprising:

(a) At least one metal salt of an organic acid containing from 4 to 18 carbon atoms, the metal being a member selected from the group consisting of lithium, sodium, potassium, magnesium, calcium, zinc, strontium, barium, cadmium, aluminum, tin and antimony;

(b) A polyhydric alcohol containing from 4 to 36 carbon atoms in the hydrocarbon moiety and at least two hydroxyl substituents wherein the number of hydroxyl groups present is less than number of carbon atoms; and (c) An organic sulfur bearing compound having the general formula $$R_1-S_x-R_2$$

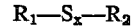

wherein $R_1$ represents a member of the group consisting of hydrogen, alkyl, alkenyl, alkynyl, aralkyl, aryl, alkyl aryl, cycloalkyl, heterocyclic radical containing a member of the group consisting of nitrogen, oxygen, or sulfur; $R_2$ represents a member of the group consisting of alkyl, alkenyl, alkynyl, aralkyl, aryl, alkyl aryl, cycloalkyl, heterocyclic radical containing a member of the group consisting of nitrogen, oxygen, or sulfur; and $x$ is a positive integer having a value of from 1 to 2 inclusive, said sulfur bearing compound having a boiling point at atmospheric pressure of at least 200° C. and containing at least one sulfur atom having at least one lone electron pair.

The present invention further provides a composition comprising a chlorine containing polymer and a stabilizing amount of:

(a) At least one metal salt of an organic acid containing from 4 to 18 carbon atoms, the metal being a member selected from the group consisting of lithium, sodium, potassium, magnesium, calcium, zinc, strontium, barium, cadmium, aluminum, tin and antimony;

(b) A polyhydric alcohol containing from 4 to 36 carbon atoms in the hydrocarbon moiety and at least two hydroxyl substituents wherein the number of hydroxyl groups present is less than the number of carbon atoms; and (c) An organic sulfur bearing compound having the general formula $$R_1-S_x-R_2$$

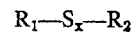

wherein $R_1$ represents a member of the group consisting of hydrogen, alkyl, alkenyl, alkynyl, aralkyl, aryl, alkyl aryl, cycloalkyl, heterocyclic radical containing a member of the group consisting of nitrogen, oxygen, or sulfur; $R_2$ represents a member of the group consisting of alkyl, alkenyl, alkynyl, aralkyl, aryl, alkyl aryl, cycloalkyl, heterocyclic radical containing a member of the group consisting of nitrogen oxygen, or sulfur; and $x$ is a positive integer having a value of from 1 to 2 inclusive, said sulfur bearing compound having a boiling point at atmospheric pressure of at least 200° C. and containing at least one sulfur atom having at least one lone electron pair.

Suitable polyhydric alcohols are aliphatic polyhydric alcohols having 4 to 24 carbon atoms and cycloaliphatic polyhydric alcohols having at least 4 carbon atoms within the aliphatic ring.

Examples of aliphatic polyhydric alcohols useful in the practice of this invention are such alcohols which can be represented by the formula:

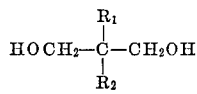

wherein $R_1$ represents hydrogen, an alkyl radical having 1 to 12 carbon atoms, or an aryl radical, and substituted derivatives of such radicals, and $R_2$ represents an alkyl radical having 1 to 12 carbon atoms or an aryl radical and substituted derivatives of such radicals.

The cycloaliphatic polyhydric alcohols suitable for use in the compositions of the instant invention are those which correspond to the general formulae:

wherein $R_1$ represents a divalent hydrocarbon radical based on cyclohexane and substituted derivatives of such a radical.

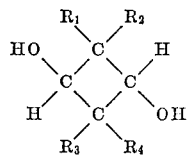

where $R_1$, $R_2$, $R_3$ and $R_4$ represent hydrogen, an alkyl, aryl or alkylaryl radical which can be the same or different and substituted derivatives of such radicals.

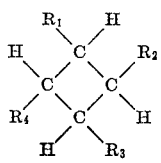

where $R_1$, $R_2$, $R_3$ and $R_4$ represent hydrogen or a $CH_2OH$ group and at least two of the symbols $R_1$, $R_2$, $R_3$ and $R_4$ represent $CH_2OH$ groups.

Some examples of particularly suitable polyhydric alcohols, but in no way limitative, are 2,2-dimethyl-1,3-propane diol; 2,2-diethyl-1,3-propane diol; 2-methyl-2-ethyl-1,3-propane diol; 1,4-cyclohexane dimethanol; 2-ethyl-2-butyl-1,3-propane diol; 2,2 - dibutyl-1,3-propane diol; 2,2,4,4-tetra methyl-1,3-cyclobutane diol; 2,2,4,4-tetra methylol cyclobutane; and 2,2-dimethyl-1,3-cyclo butane diol.

The proportion by weight of polyhydric alcohol in relating to weight of the polymer in the polymer compositions can vary within wide limits and is suitably 0.25 to 10 percent and preferably 2 to 5 percent.

By the term sulfur bearing compound is meant an organic sulfur bearing compound having a boiling point at atmospheric pressure of not less than 200° C. which contains at least one sulfur atom with at least one lone electron pair which can be represented by the formula:

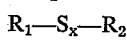

wherein $R_1$ can be selected from the group consisting of hydrogen, alkyl, alkenyl, alkynyl, aralkyl, aryl, alkyl aryl or cycloalkyl radicals, or a radical having a heterocyclic ring containing nitrogen, oxygen or sulfur or subsituted derivatives of these radicals; $R_2$ can be selected from the group consisting of an alkyl, alkenyl, alkynyl, aralkyl, aryl, alkyl aryl, or cycloalkyl radical, or a radical having a heterocyclic ring containing nitrogen, oxygen or sulfur or substituted derivatives of these radicals; and $x$ is a positive integer having a value from 1 to 2 inclusive. Examples of substituents are the following groups: hydroxyl, alkoxy, carboxyl, carboxylate, ketone, aldehyde, amine, mercapto, sulfonic acid or halogen. The organic sulfur bearing compound should preferably not be oxidizable to a colored compound where the stabilizer is to be used in polymers in which color is undesirable.

The preferred organic sulfur bearing compounds although not limited thereto are thioglycollic acid, thiodiglycollic acid, dithiodiglycollic acid, $\beta$-mercapto propionic acid, $\beta,\beta'$-thiodipropionic acid, diluaryl dithiodipropionate, diluaryl, $\beta,\beta'$-thiodipropionate, lauryl thioglycollate, diluaryl dithioglycollate, bis (n-dodecyloxy ethyl) sulfide, 3-benzyl mercapto propionic acid, dithiodipropionic acid, S-benzyl thioglycollic acid, $\beta,\beta'$-dihydroxy ethyl sulfide, dilauryl thiodipropionate, dibenzyl sulfide, and dibenzoyl disulfide.

The proportion by weight of organic sulfur bearing compound in relation to the weight of polymer in the polymer compositions can vary within wide limits and is suitably in the range 0.1 to 5 percent.

These sulfur compounds appear to assert a synergistic stabilizing action in conjunction with the other ingredients of the stabilizer compositions according to the present invention.

Any stabilizer metal salt can be used in the stabilizer compositions. Some examples of known salts are previously described in this specification.

Most suitably the acids from which these metal salts can be prepared are saturated or unsaturated aliphatic acids containing 4 to 18 carbon atoms and aromatic substituted or unsubstituted acids. Examples are benzoic, p-tertiary butyl benzoic, salicylic, acetyl salicylic, p-chloro benzoic, 2,4-dichloro benzoic, phthalic, maleic, itaconic, 3,6-endomethylene-1,3,3,6-tetra hydrophthalic and chlorendic acid and acid esters.

The proportion by weight of stabilizer metal salt or salts in relation to the weight of polymer in the polymer composition can vary within wide limits and depends upon the required degree of protection against color change. Suitable proportions, however, are in the range 0.5 to 10 percent.

Whereas in the present invention the use of a single metal salt in combination with a polyhydric alcohol and a sulfur compound as a stabilizing composition for chlorine containing polymers as set forth above are satisfactory to produce a stable product it is to be understood that combinations of two or three different metal salts can be used such as a zinc salt of a mono-ester of an $\alpha,\beta$-ethylenically unsaturated dicarboxylic acids in which the metal radicals are different and selected from the group consisting of lithium, sodium or potassium, strontium, calcium and magnesium.

Mono-esters of $\alpha,\beta$-ethylenically unsaturated dicarboxylic acids from which the metal salts used to form the stabilizer compositions can be formed, include esters derived from alkyl, aryl or alkaryl alcohols. Particularly suitable esters are derived from alcohols having alkyl groups with a straight chain length of $C_1$ to $C_{18}$ and preferably from $C_1$ to $C_9$ carbon atoms. The preferred $\alpha,\beta$-ethylenically unsaturated dicarboxylic acids from which these esters can be derived are maleic, itaconic and fumaric acids.

Some examples of suitable esters are the mono-butyl, 2-ethyl hexyl, hexyl, cyclohexyl, n-heptyl, n-octyl, nonyl, decyl, lauryl, stearyl, and benzyl maleates or itaconates.

Typical salts are lithium butyl itaconate, lithium 2-ethyl hexyl maleate, lithium lauryl maleate, lithium stearyl maleate, strontium butyl itaconate, strontium 2-ethyl hexyl maleate, strontium lauryl maleate, strontium benzyl maleate, strontium cyclohexyl maleate, calcium butyl itaconate, calcium benzyl maleate, calcium 2-ethyl hexyl maleate, calcium cyclohexyl maleate, calcium n- heptyl maleate, calcium n-octyl maleate, calcium n-decyl maleate, magnesium butyl itaconate, magnesium 2-ethyl hexyl maleate, magnesium lauryl maleate, magnesium benzyl maleate, magnesium cyclohexyl maleate, sodium 2-ethyl hexyl maleate, sodium lauryl maleate, zinc butyl itaconate, zinc 2-ethyl hexyl maleate, zinc lauryl maleate, zinc benzyl maleate and zinc cyclohexyl maleate.

The preferred salts are the zinc, strontium, magnesium, calcium and sodium 2-ethyl hexyl maleates and strontium and calcium butyl itaconates.

Preferably an organic epoxide compound, as hereinafter defined, can be included in the stabilizing compositions according to the present invention. These organic epoxide compounds appear to assert a synergistic stabilizing action in conjunction with the other components of the compositions. By the term organic epoxide compound is meant throughout this specification a compound having a boiling point at atmospheric pressure of not less than 200° C. and at least one epoxy group in a carbon/carbon chain or in a carbon/carbon/oxygen chain or in a carbocyclic compound or in oxygen containing heterocyclic compound. Examples of suitable epoxide compounds are the epoxy vegetable oils, epoxy tall oil esters and epoxy resins. Examples of epoxy resins are polymers and copolymers of glycidyl methacrylate, e.g. polyglycidyl methacrylate; an 80:20 glycidyl methacrylate-acrylonitrile copolymer; a 50:50 glycidyl methacrylate-methyl methacrylate copolymer; a 70:30 glycidyl methacrylate-vinyl acetate copolymer and a 50:50 glycidyl methacrylate-vinyl chloride copolymer.

Preferably the number of carbon atoms in any carbon/carbon chain within the organic epoxide compound molecule should not exceed 30.

The preferred compounds, but in no way limitative, are epoxy soya bean oil, epoxy linseed oil, iso octyl epoxy tallate, mono-bromo phenyl glycidyl ether, dibromo cresyl glycidyl ether, glyceryl epoxy monooleate, 3,4-epoxy-6-methyl cyclohexyl methyl 3,4-epoxy-6-methyl cyclohexane carboxylate, Dow Epoxy Resin 332, a liquid epoxy resin of the bisphenol A type, and Dow Epoxy Resin X–26732 and X–26736 both of which are straight chain diglycidyl ethers of various molecular weights.

The proportion by weight of organic epoxide compound in relation to the weight of the polymer in the polymer compositions can vary within wide limits and is suitably in the range 0.5 to 15 percent.

The stabilized chlorine containing polymers according to the present invention can also contain plasticizers and other stabilizers such as ultra violet light absorbers. Examples of such compounds include triphenyl phosphite, various substituted benzophenones and benzotriazoles. The stabilized polymers may also contain any of the usual coloring and toning pigments, fillers and lubricants.

The stabilizer compositions according to the present invention show an improved thermal stabilizing action and compatibility with chlorine containing polymers over stabilizer compositions containing polyols of the type already known. Furthermore the stabilizing effect is greater than that which would have been expected by the summation of the individual effects of the components of the composition.

The invention is illustrated by the following non-limiting examples:

EXAMPLE 1

80 grams of a vinyl chloride/vinyl acetate copolymer containing 10 percent interpolymerized vinyl acetate and 20 grams of a vinyl chloride/dioctyl fumarate copolymer containing about 15 percent dioctyl fumarate was mixed with 1 gram Wax OP and as a stabilizer mixture, 1 gram dibutyl tin maleate, 2.0 grams 2,2-dimethyl 1-3 propane diol and 0.5 gram dilauryl thio dipropionate. The resulting composition was milled on an open twin roll mill at 170–175° C. After 30 minutes milling the plastic was a light yellow color. By way of comparison a composition containing 1.0 gram dibutyl tin maleate as the only stabilizer was a tan color after milling under the same conditions.

EXAMPLE 2

80 grams of a vinyl chloride/vinyl acetate copolymer containing 10 percent interpolymerized vinyl acetate and 20 grams of a vinyl chloride/dioctyl fumarate copolymer containing about 15 percent dioctyl fumarate were mixed with 0.25 gram Wax OP and a stabilizing mixture comprising 2 grams strontium 2-ethylhexyl maleate, 0.75 gram of each of magnesium and zinc 2-ethylhexyl maleate, 2.0 grams 2,2-dimethyl 1,3 propane diol, 0.25 gram dilauryl thio dipropionate and 4.0 grams epoxy soya bean oil. The stabilizer composition and resin were then milled on an open twin roll mill at a temperature of 165–170° C. After one hour's milling the plastic was still only yellow in color. By way of comparison a control composition containing all ingredients except the 2,2-dimethyl 1,3 propane diol and dilauryl thiodipropionate went orange tan after 60 minutes milling.

EXAMPLE 3

Similar results to those in Example 2 where obtained using 1,4-cyclohexane dimethanol in place of the 2,2-dimethyl 1–3 propane diol.

EXAMPLE 4

100 grams of a vinyl chloride/vinyl acetate copolymer containing 4 percent interpolymerized vinyl acetate was mixed with a stabilizing mixture comprising 1.0 gram barium stearate, 1.0 gram cadmium stearate, 2.0 grams 2,2-dimethyl 1,3 propane diol and 0.5 gram dilauryl thiodipropionate. The resin and stabilizers were milled in the manner already described. After 25 minutes milling the plastic was a light yellow color. By way of comparison a control formulation containing only barium stearate and cadmium stearate went black after milling for 22 minutes.

EXAMPLE 5

Similar results to those in Example 4 were obtained using 2,2,4,4-tetramethyl 1,3 cyclobutane diol in place of 2,2-dimethyl 1,3 propane diol.

EXAMPLE 6

100 grams of a vinyl chloride homopolymer (K value 65) and 0.25 gram Wax OP were mixed with a stabilizing mixture comprising 2.0 grams barium heptyl maleate, 1.0 gram cadmium heptyl maleate, 1.0 gram zinc 2-ethylhexyl maleate, 2.0 grams epoxy soya bean oil, 0.5 gram dilauryl thiodipropionate and 2.0 grams 2,2-dimethyl 1,3 propane diol. The resin and stabilizer mixture were milled in the manner already described. After 30 minutes, the plastic was a light yellow color, whereas by way of comparison a control composition comprising all ingredients except the dilauryl thiodipropionate and 2,2-dimethyl 1,3 propane diol, turned a light orange color after 20 minutes.

EXAMPLE 7

80 grams of a vinyl chloride/vinyl acetate copolymer containing 10 percent interpolymerized vinyl acetate and 20 grams of a vinyl chloride dioctyl fumarate copolymer containing about 15 percent dioctyl fumarate were mixed with 2 grams Wax OP and a stabilizer mixture comprising 2.0 grams calcium 2-ethylhexyl maleate, 0.75 magnesium 2-ethylhexyl maleate, 1.0 gram zinc 2-ethylhexyl maleate, 4.0 grams epoxy linseed oil, 0.5 gram dilauryl thiodipropionate and 2.0 grams 2,2,4,4-tetramethyl 1,3 cyclobutane diol. The resin and stabilizer were milled at 165–170° C. After 50 minutes milling the plastic was a light yellow color, while after one hour the color was light orange.

By way of comparison a control composition containing all of the ingredients except the dilauryl thiodipropionate and the 2,2,4,4-tetramethyl 1,3 cyclobutane diol was milled in a similar manner and was a tan-brown color after 50 minutes.

EXAMPLE 8

100 grams of a vinyl chloride/vinyl cetyl ether copolymer containing about 4 percent interpolymerized vinyl cetyl ether were mixed with 1.0 gram Wax OP and a stabilizer mixture comprising 2.0 grams calcium n-heptyl maleate, 0.75 gram magnesium 2-ethylhexyl maleate, 1 gram zinc 2-ethylhexyl maleate, 2.0 grams 2,2-dimethyl 1,3 propane diol, 0.5 gram dilauryl thiodipropionate and 4.0 grams epoxy linseed oil. The resin and stabilizer were milled at 170–175° C. After one hour's milling only a very pale yellow color had developed.

EXAMPLE 9

80 grams of a vinyl chloride/vinyl acetate copolymer containing 10 percent interpolymerized vinyl acetate and 20 grams of a vinyl chloride-dioctyl fumarate copolymer containing 15 percent dioctyl fumarate were mixed with 1.0 gram Wax OP and a stabilizer mixture comprising 2.0 grams calcium 2-ethylhexyl maleate, 0.75 gram magnesium 2-ethylhexyl maleate, 1.0 gram zinc 2-ethylhexyl maleate, 2.0 grams 2,2-dimethyl 1,3 propane diol, 0.5 gram dilauryl thiodipropionate, and 4.0 grams of an epoxy compound consisting of a copolymer of glycidyl methacrylate and acrylonitrile (containing 20 percent acrylonitrile). The resin and stabilizer were milled at 165–175° C. After one hour's milling the plastic had degraded only to a light yellow color.

EXAMPLE 10

100 grams of vinyl chloride homopolymer (K value 55) where mixed with 0.5 gram stearyl alcohol (lubricant) and a stabilizer mixture 1.5 gram calcium n-heptyl maleate, 1.0 gram zinc 2-ethylhexyl maleate, 0.75 gram magnesium 2-ethylhexyl maleate, 2.0 grams 2,2-dimethyl 1,3 propane diol, 0.5 gram dibenzyl sulfide, and 4.0 grams epoxy linseed oil. The resin and stabilizer mixture were milled at 170–175° C. After 45 minutes milling the plastic was a very pale yellow color.

By way of comparison a control composition containing all the ingredients except 2,2-dimethyl 1,3 propane diol and dibenzyl sulfide was bright yellow after milling under the same conditions for the same length of time.

EXAMPLE 11

Similar results to those of Example 10 where obtained, when the dithio-β,β-dipropionic acid was used in place of dibenzyl sulfide.

EXAMPLE 12

Similar results to those of Example 10 were obtained, when S-benzyl thioglycollic acid was used in place of dibenzyl sulfide.

EXAMPLE 13

Similar results to those of Example 10 were obtained, when bis (n-dodecyloxyethyl) sulfide was used in place of dibenzyl sulfide.

EXAMPLE 14

Similar results to those to Example 10 were obtained, when dibenzoyl disulfide was used in place of dibenzyl sulfide.

Similarly in the practice of the present invention metals such as lithium, sodium, potassium, aluminum, lead, and antimony can be substituted in the metal salts of the preceding examples to obtain comparable results.

What is claimed is:

1. A stabilizing composition for chlorine containing polymers comprising:
   (a) no more than two metal salts of an organic acid containing from 4 to 18 carbon atoms, said metal being a member selected from the group consisting of lithium, sodium, potassium, magnesium, calcium, zinc, strontium, barium, cadmium, aluminum, tin and antimony and wherein the proportion by weight of the metal salt in relation to the weight of chlorine containing polymer is in the range 0.5 to 10 percent;
   (b) a polyhydric alcohol containing from 4 to 36 carbon atoms in the hydrocarbon moiety and at least two hydroxyl substituents wherein the number of hydroxyl groups present is less than the number of carbon atoms and wherein the proportion by weight of polyhydric alcohol in relation to the weight of chlorine containing polymer is in the range 0.25 to 10 percent; and
   (c) an organic sulfur bearing compound wherein the proportion by weight of sulfur compound in relation to the weight of chlorine containing polymer is in the range 0.1 to 5 percent having the general formula

wherein $R_1$ represents a member of the group consisting of hydrogen, alkyl, alkenyl, alkynyl, aralkyl, aryl, alkyl aryl, cycloalkyl, heterocyclic radial containing a member of the group consisting of nitrogen, oxygen, and sulfur, and substituted derivatives thereof wherein the substituent is selected from the group consisting of hydroxyl, alkoxy, carboxyl, carboxylate, ketone, aldehyde, amine, mercapto, sulfonic acid and halogen; $R_2$ represents a member of the group consisting of alkyl, alkenyl, alkynyl, aralkyl, aryl, alkyl aryl, cycloalkyl, heterocyclic radical containing a member of the group consisting of nitrogen, oxygen, and sulfur, and substituted derivatives thereof wherein the substituent is selected from the group consisting of hydroxyl, alkoxy, carboxyl, carboxylate, ketone, aldehyde, amine, mercapto, sulfonic acid and halogen; and $x$ is a positive integer having a value of from 1 to 2 inclusive, said sulfur bearing compound having a boiling point at atmospheric pressure of at least 200° C. and containing at least one sulfur atom having at least one lone electron pair.

2. The stabilizing composition of claim 1 wherein the polyhydric alcohol has the general formula selected from the group consisting of:

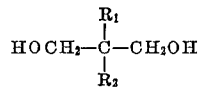

wherein $R_1$ represents hydrogen, alkyl, and aryl, and $R_2$ represents alkyl, and aryl;

$$HOCH_2\text{---}R_1\text{---}CH_2OH$$

wherein $R_1$ represents a divalent hydrocarbon radical based on cyclohexane;

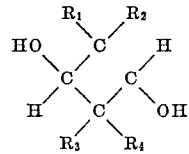

wherein $R_1$, $R_2$, $R_3$ and $R_4$ represent hydrogen, alkyl, aryl, and alkyl aryl, and

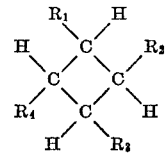

wherein $R_1$, $R_2$, $R_3$ and $R_4$ represent hydrogen, $CH_2OH$ group and at least two of said R's are represented by $CH_2OH$ groups.

3. The stabilizing composition of claim 1 wherein an organic epoxide compound is present in the range 0.5 to 15 percent by weight in relation to the weight of chlorine containing polymer.

4. The stabilizing composition of claim 1 wherein the metal salt is zinc 2-ethylhexyl maleate.

5. The stabilizing composition of claim 1 wherein the polyhydric alcohol is 2,2-dimethyl 1,3 propane diol.

6. The stabilizing composition of claim 1 wherein the organic sulfur bearing compound is dilauryl thiodipropionate.

7. The stabilizing composition of claim 3 wherein said epoxide composition is present in an amount of at least 0.5 percent by weight based on the weight of said polymer.

8. The stabilizing composition of claim 7 wherein the epoxide composition is epoxy linseed oil.

9. A composition comprising:
   (a) chlorine containing polymer wherein at least 50 percent by number of polymerized units are formed from chlorine containing unsaturated olefinic monomers, and
   (b) a stabilizing amount of:
      (b₁) no more than two metal salts of an organic acid containing from 4 to 18 carbon atoms, said metal being a member selected from the group consisting of lithium, sodium, potassium, magnesium, calcium, zinc, strontium, barium, cadmium, aluminum, tin and antimony and wherein the proportion by weight of the metal salt in relation to the weight of chlorine containing polymer is in the range 0.5 to 10 percent;
      (b₂) a polyhydric alcohol containing from 4 to 36 carbon atoms in the hydrocarbon moiety and at least two hydroxyl substituents wherein the number of hydroxyl groups present is less than the number of carbon atoms and wherein the proportion by weight of polyhydric alcohol in relation to the weight of chlorine containing polymer is in the range 0.25 to 10 percent; and
      (b₃) an organic sulfur bearing compound wherein the proportion by weight of sulfur compound in relation to the weight of chlorine containing polymer is in the range 0.1 to 5 percent having the general formula $$R_1-S_x-R_2$$

wherein $R_1$ represents a member of the group consisting of hydrogen, alkyl, alkenyl, alkynyl, aralkyl, aryl, alkyl aryl, cycloalkyl, heterocyclic radical containing a member of the group consisting of nitrogen, oxygen, and sulfur, and substituted derivatives thereof wherein the substituent is selected from the group consisting of hydroxyl, alkoxy, carboxyl, carboxylate, ketone, aldehyde, amine, mercapto, sulfonic acid and halogen; $R_2$ represents a member of the group consisting of alkyl, alkenyl, alkynyl, aralkyl, aryl, alkyl aryl, cycloalkyl, heterocyclic radical containing a member of the group consisting of nitrogen, oxygen, and sulfur, and substituted derivatives thereof wherein the substituent is selected from the group consisting of hydroxyl, alkoxy, carboxyl, carboxylate, ketone, aldehyde, amine, mercapto, sulfonic acid and halogen; and $x$ is a positive integer having a value of from 1 to 2 inclusive, said sulfur bearing compound having a boiling point at atmospheric pressure of at least 200° C. and containing at least one sulfur atom having at least one lone electron pair.

10. The composition of claim 9 wherein the metal salt is present in an amount of at least 0.5 percent by weight based on the weight of said polymer; the polyhydric alcohol is present in an amount of at least 0.25 percent by weight based on the weight of said polymer; and the organic sulfur bearing compound is present in an amount of at least 0.1 percent by weight based on the weight of said polymer.

11. The stabilized composition of claim 9 wherein the polyhydric alcohol has the general formula selected from the group consisting of:

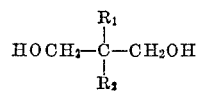

wherein $R_1$ represents hydrogen, alkyl, and aryl and $R_2$ represents alkyl aryl and substituted derivatives thereof;

$$HOCH_2-R_1-CH_2OH$$

wherein $R_1$ represents a divalent hydrocarbon radical based on cyclohexane;

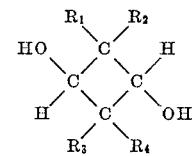

wherein $R_1$, $R_2$, $R_3$ and $R_4$ represent hydrogen, alkyl, aryl, and alkyl aryl,

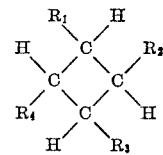

wherein $R_1$, $R_2$, $R_3$ and $R_4$ represent hydrogen, $CH_2OH$ group, and at least two of said R's are represented by $CH_2OH$ groups.

12. The stabilizing composition of claim 9 wherein an organic epoxide compound is present in the range 0.5 to 15 percent by weight in relation to the weight of chlorine containing polymer.

13. The composition of claim 9 wherein the metal salt is zinc 2-ethylhexyl maleate.

14. The composition of claim 9 wherein the polyhydric alcohol is 2,2-dimethyl 1,3 propane diol.

15. The composition of claim 9 wherein the organic sulfur bearing compound is dilauryl thiodipropionate.

16. The composition of claim 12 wherein the epoxide compound is present in an amount of at least 0.5 percent based on the weight of said polymer.

17. The composition of claim 16 wherein the epoxide composition is epoxy linseed oil.

References Cited

UNITED STATES PATENTS

| | | | |
|---|---|---|---|
| 2,564,646 | 8/1951 | Leistner et al. | 260—45.7 |
| 2,711,401 | 6/1955 | Lally | 260—45.75 |
| 2,734,881 | 2/1956 | Lally et al. | 260—23 |
| 3,054,771 | 9/1962 | Hiestand et al. | 260—23 |
| 3,063,963 | 11/1962 | Wooten et al. | 260—45.75 |
| 3,144,422 | 8/1964 | Homberg | 260—23 |
| 3,242,133 | 3/1966 | Lindsey | 260—45.7 |
| 3,285,868 | 11/1966 | Hecker et al. | 260—23 |
| 3,321,423 | 5/1967 | Scullin et al. | 260—23 |

DONALD E. CZAJA, *Primary Examiner.*

R. A. WHITE, *Assistant Examiner.*

U.S. Cl. X.R.

252—406; 260—45.7, 45.75, 45.8, 45.85, 45.95